(12) United States Patent
Lin et al.

(10) Patent No.: US 10,768,667 B2
(45) Date of Patent: Sep. 8, 2020

(54) FOLDABLE DISPLAY DEVICE

(71) Applicant: E Ink Holdings Inc., Hsinchu (TW)

(72) Inventors: Yi-Sheng Lin, Hsinchu (TW);
Chia-Chun Yeh, Hsinchu (TW);
Hsing-Kai Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/548,818

(22) Filed: Aug. 22, 2019

(65) Prior Publication Data
US 2020/0103941 A1 Apr. 2, 2020

(30) Foreign Application Priority Data

Sep. 28, 2018 (TW) .............................. 107134508 A

(51) Int. Cl.
*G06F 1/16* (2006.01)
*H04M 1/02* (2006.01)
*G09F 9/30* (2006.01)

(52) U.S. Cl.
CPC .......... *G06F 1/1641* (2013.01); *G06F 1/1681* (2013.01); *G09F 9/301* (2013.01); *H04M 1/0268* (2013.01)

(58) Field of Classification Search
CPC ...... H06F 1/1681; H06F 1/1641; H09F 9/301; H04M 1/0268
See application file for complete search history.

(56) References Cited

U.S. PATENT DOCUMENTS

| 8,727,601 | B2 | 5/2014 | Wang et al. |
| 8,804,349 | B2 * | 8/2014 | Lee ........................ G06F 1/1641 361/749 |
| 8,908,365 | B2 | 12/2014 | Walters et al. |
| 9,071,673 | B2 | 6/2015 | Choi et al. |
| 9,164,547 | B1 | 10/2015 | Kwon et al. |
| 9,173,288 | B1 | 10/2015 | Kim |
| 9,348,362 | B2 | 5/2016 | Ko et al. |

(Continued)

FOREIGN PATENT DOCUMENTS

| TW | 201352119 A | 12/2013 |
| TW | 201521541 A | 6/2015 |

(Continued)

OTHER PUBLICATIONS

Corresponding Taiwan office action dated May 31, 2019.

*Primary Examiner* — Hoa C Nguyen
(74) *Attorney, Agent, or Firm* — CKC & Partners Co., LLC

(57) ABSTRACT

A foldable display device includes a central connector, a first support structure, a second support structure, a cable, and a display panel. The central connector has an abutment post. The first support structure is pivoted to the central connector and includes a first recess, a first plate, a first support element, and plural first flexible elements. The second support structure is pivoted to the central connector and has a second recess, a second plate, a second support element, and plural second flexible elements. Two ends of the cable are respectively connected to one end of the first support element and one end of the second support element, and the cable abuts beneath the abutment post. A portion of the display panel is movably disposed over the first support structure, and another portion of the display panel is fixed on the second support structure.

16 Claims, 12 Drawing Sheets

(56) References Cited

U.S. PATENT DOCUMENTS

| | | | |
|---|---|---|---|
| 9,348,369 B2 | 5/2016 | Kee et al. | |
| 9,572,272 B2 | 2/2017 | Lee | |
| 9,811,119 B2 | 11/2017 | Seo | |
| 10,423,019 B1* | 9/2019 | Song | G06F 1/1681 |
| 10,474,203 B2* | 11/2019 | Tazbaz | G06F 1/1616 |
| 10,480,225 B1* | 11/2019 | Hsu | G06F 1/1616 |
| 10,520,992 B1* | 12/2019 | Chang | G06F 1/16 |
| 10,585,459 B2* | 3/2020 | Chen | G06F 1/1652 |
| 2013/0342094 A1* | 12/2013 | Walters | H04M 1/0247 312/319.2 |
| 2014/0029171 A1* | 1/2014 | Lee | G09F 9/301 361/679.01 |
| 2014/0042293 A1* | 2/2014 | Mok | H04M 1/0268 248/682 |
| 2015/0013107 A1* | 1/2015 | Shin | E05D 3/06 16/366 |
| 2016/0139634 A1 | 5/2016 | Cho et al. | |
| 2018/0213663 A1* | 7/2018 | Lin | E05D 11/0054 |
| 2019/0012028 A1* | 1/2019 | Park | G06F 1/1681 |
| 2019/0339742 A1* | 11/2019 | Jia | G06F 1/1681 |

FOREIGN PATENT DOCUMENTS

| | | |
|---|---|---|
| TW | 201643680 A | 12/2016 |
| TW | 201712651 A | 4/2017 |

\* cited by examiner

FOLDABLE DISPLAY DEVICE

CROSS-REFERENCE TO RELATED APPLICATION

This application claims priority to Taiwan Application Serial Number 107134508, filed on Sep. 28, 2018, which is herein incorporated by reference.

BACKGROUND

Field of Invention

The present invention relates to a display device, and more particularly to a foldable display device.

Description of Related Art

Recently, even in portable electronic devices, the demand for large screens has been increasing. A foldable display device using a bendable or foldable flexible display panel provides portability and may be used as a display unit for displaying a large screen. The foldable display device is applied not only to portable electronic devices such as mobile communication terminals, electronic tickets, electronic books, portable multimedia players (PMPs), navigation devices, ultra-mobile personal computers (PCs), mobile phones, smart phones and tablets, but also to different fields such as TVs and monitors.

The underside of the bent portion of the display panel of the existing foldable display device is usually suspended or entirely adhered to the support structure. However, these two structures will introduce negative impacts on the display panel. Specifically, when the foldable display device having the suspended bent portion is bent, the stress will be concentrated on an edge of the suspended bent portion, which may cause damage to the edge thereof. In another aspect, when the foldable display device having the bent portion entirely adhered to the support structure is closed, the compressive stress caused by an inner diameter difference between the display panel and the support structure may cause the bent portion to protrude inwardly and to separate from the support structure.

SUMMARY

In view of the above, it is a purpose of the present invention to provide a foldable display device that can solve the above problems.

In order to achieve the above purpose, an aspect of the present invention provides a folding display device, which includes a central connector, a first support structure, a second support structure, a cable, and a display panel. The central connector has an abutment post. The first support structure is pivoted to the central connector. The first support structure includes a first recess, a first plate, a first support element, and plural first flexible elements. The first recess is located in the central connector. The first plate is disposed in the first recess. The first support element is movably located over the first plate. One of the first flexible elements is located between a first end of the first support element and a sidewall of the first recess, and the remaining first flexible elements are located between the first plate and a bottom surface of the first recess. The second support structure is pivoted to the central connector, and the second and first support structures are respectively located at two opposite sides of the central connector. The second support structure has a second recess, a second plate, a second support element, and plural second flexible elements. The second recess is located in the central connector. The second plate is disposed in the second recess. The second support element is movably located over the second plate. One of the second flexible elements is located between a first end of the second support element and a sidewall of the second recess, and the remaining second flexible elements are located between the second plate and a bottom surface of the second recess. Two ends of the cable are respectively connected to one end of the first support element and one end of the second support element, and the cable abuts beneath the abutment post. A portion of the display panel is movably disposed over the first support structure, and another portion of the display panel is fixed on the second support structure.

According to some embodiments of the present disclosure, the first support structure further includes at least one protruding component. The display panel includes a display region and a non-display region, and the non-display region includes at least one hole. The protruding component is disposed in the hole.

According to some embodiments of the present disclosure, the protruding component is a gear or a metal post.

According to some embodiments of the present disclosure, a second end of the first support element and a second end of the second support element respectively have a convex surface and a concave surface coupled to each other.

According to some embodiments of the present disclosure, the foldable display device further includes a frame disposed over the display panel. The frame includes a first frame, a second frame, a first hinge, and a second hinge. The first hinge has a first terminal end and a second terminal end pivoted to the first frame and the second frame, respectively, and the second hinge has a third terminal end and a fourth terminal end pivoted to the first frame and the second frame, respectively.

According to some embodiments of the present disclosure, each of the first hinge and the second hinge includes a plurality of hinge units. Each of the hinge units includes a hinge body and a roller. The roller is disposed in the hinge body and in contact with the display panel.

According to some embodiments of the present disclosure, the first frame is in contact with an upper surface of a non-display region of the display panel.

According to some embodiments of the present disclosure, the first frame has a side portion, and the side portion includes a first round wheel in contact with an upper surface of a non-display region of the display panel.

According to some embodiments of the present disclosure, the first support structure has a side portion, and the side portion includes a second round wheel in contact with a lower surface of a non-display region of the display panel.

According to some embodiments of the present disclosure, the display panel further includes a first electrode, and one of the first support element and the second support element includes a second electrode, and the first electrode is overlapped with the second electrode.

According to some embodiments of the present disclosure, the display panel is in contact with an upper surface of the first support structure.

According to some embodiments of the present disclosure, the foldable display device further includes a first axle assembly disposed in the first recess. The first axle assembly includes a first wheel and a second wheel, and the first wheel is coaxial with the second wheel, and a radius of the first wheel is greater than a radius of the second wheel. The cable includes a first portion and a second portion adjacent to each other. The first portion of the cable connects a terminal end of the first support element and winds the first wheel, and the second portion of the cable winds the second wheel.

According to some embodiments of the present disclosure, the foldable display device further includes a second axle assembly disposed in the second recess. The second axle assembly includes a third wheel and a fourth wheel, and the third wheel is coaxial with the fourth wheel, and a radius of the third wheel is greater than a radius of the fourth wheel. The cable further includes a third portion adjacent to the second portion. The second portion surrounds and is fixed beneath the abutment post and winds the fourth wheel, and the third portion winds the third wheel and connects a terminal end of the second support element.

According to some embodiments of the present disclosure, the central connector further includes a first sheet and a second sheet. The abutment post connects the first sheet and the second sheet. The first sheet has a first sliding slot and a second sliding slot, and the second sheet has a third sliding slot and a fourth sliding slot.

According to some embodiments of the present disclosure, the first support structure has a pair of first protruding portions respectively disposed in the first sliding slot and the third sliding slot.

According to some embodiments of the present disclosure, the second support structure has a pair of second protruding portions respectively disposed in the second sliding slot and the fourth sliding slot.

In the above embodiments of the present invention, the foldable display device has the first support element and the second support element that may be pushed when unfolded and retracted when folded. With such design, the central region of the display panel may be supported by the first support element and the second support element when unfolded, and there is a sufficient space beneath the central portion of the display panel for extending downward to avoid the display panel from being subjected to additional stress when bent. In addition, the foldable display device only secures a portion of the display panel such that another portion of the display panel may be moved over the first support structure when bent to avoid damaging the display panel.

BRIEF DESCRIPTION OF THE DRAWINGS

The invention may be more fully understood by reading the following detailed description of the embodiment, with reference made to the accompanying drawings as follows.

DETAILED DESCRIPTION

Figure 1:
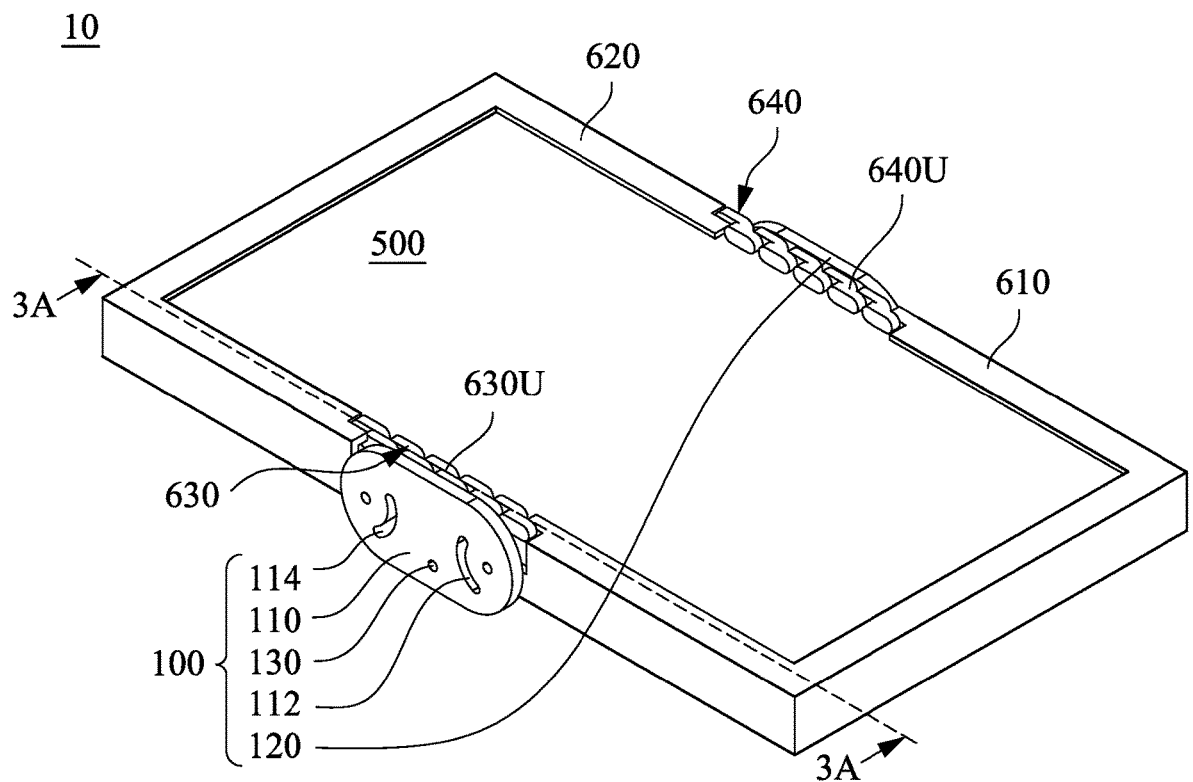
FIG. 1 is a perspective view showing a foldable display device in an unfolded state according to an embodiment of the present invention.

The various embodiments of the present invention are disclosed in the drawings. For clarity, many practical details will be explained in the following description. However, it should be understood that these practical details are not intended to limit the invention. That is, in some embodiments of the invention, these practical details are not necessary. In addition, some of the conventional structures and elements are shown in the drawings in a simplified schematic manner in order to simplify the drawings.

Figure 2:
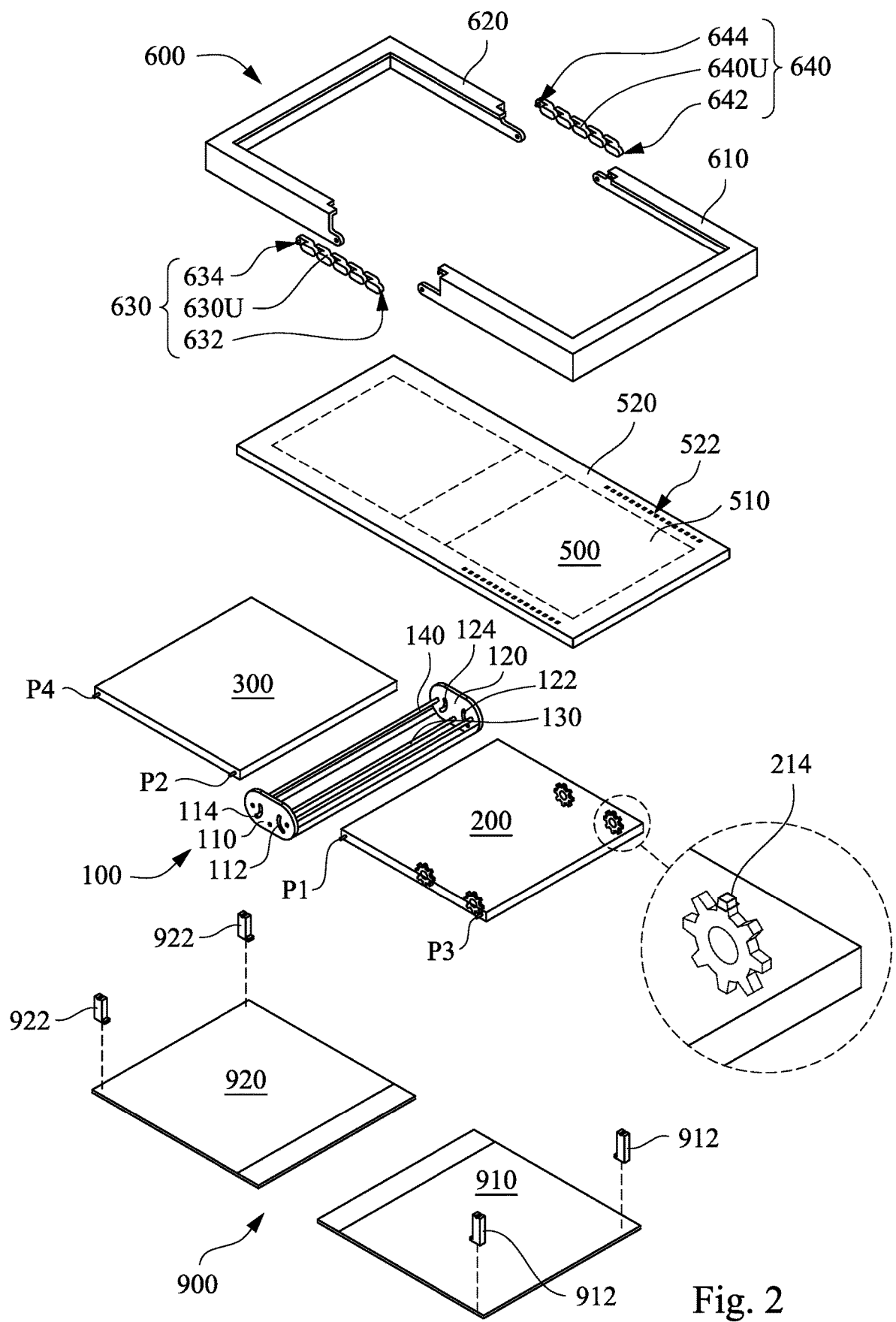
FIG. 2 is an exploded view showing the foldable display device in the unfolded state of FIG. 1.

FIG. 1 is a perspective view showing a foldable display device 10 in an unfolded state according to an embodiment of the present invention. FIG. 2 is an exploded view showing the foldable display device 10 in the unfolded state of FIG. 1. Referring to FIGS. 1 and 2 simultaneously, the foldable display device 10 includes a central connector 100, a first support structure 200, a second support structure 300, and a display panel 500. The central connector 100 has an abutment post 130. In various embodiments, the central connector 100 further includes a first sheet 110 and a second sheet 120. More specifically, the first sheet 110 is disposed opposite to the second sheet 120, and the abutment post 130 connects the first sheet 110 and the second sheet 120. In various examples, the abutment post 130 may be a cylindrical long rod. In some embodiments, the central connector 100 may further include a plurality of sub-connection posts 140 for securing the first sheet 110 and the second sheet 120. In various examples, the sub-connection posts 140 may be cylindrical long rods or other geometric right prisms. In addition, the first sheet 110 has a first sliding slot 112 and a second sliding slot 114, and the second sheet 120 has a third sliding slot 122 and a fourth sliding slot 124. In various embodiments, the first sliding slot 112, the second sliding slot 114, the third sliding slot 122, and the fourth sliding slot 124 may be designed in a curved shape.

Figure 3A:
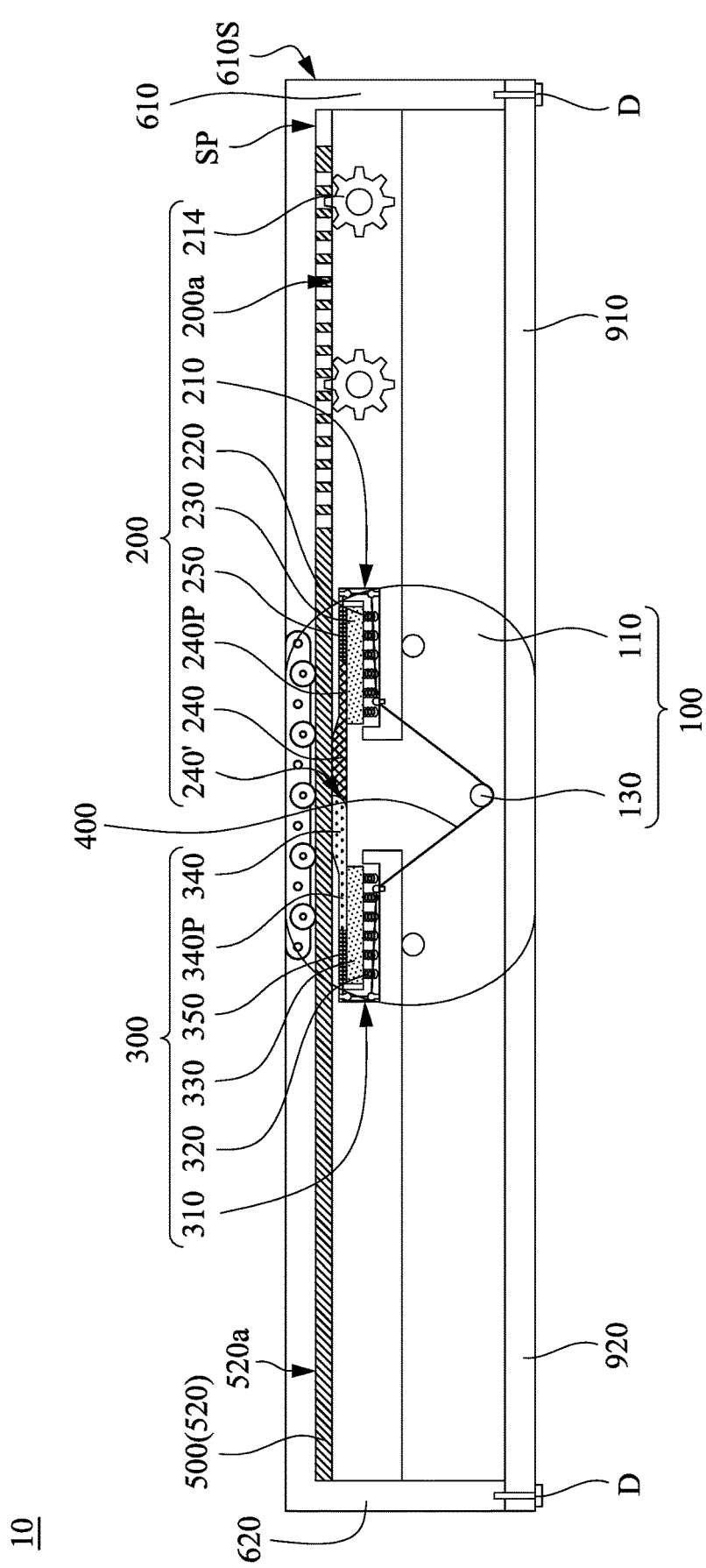
FIG. 3A is a cross-sectional view taken along line 3A-3A of FIG. 1.
Figure 3B:
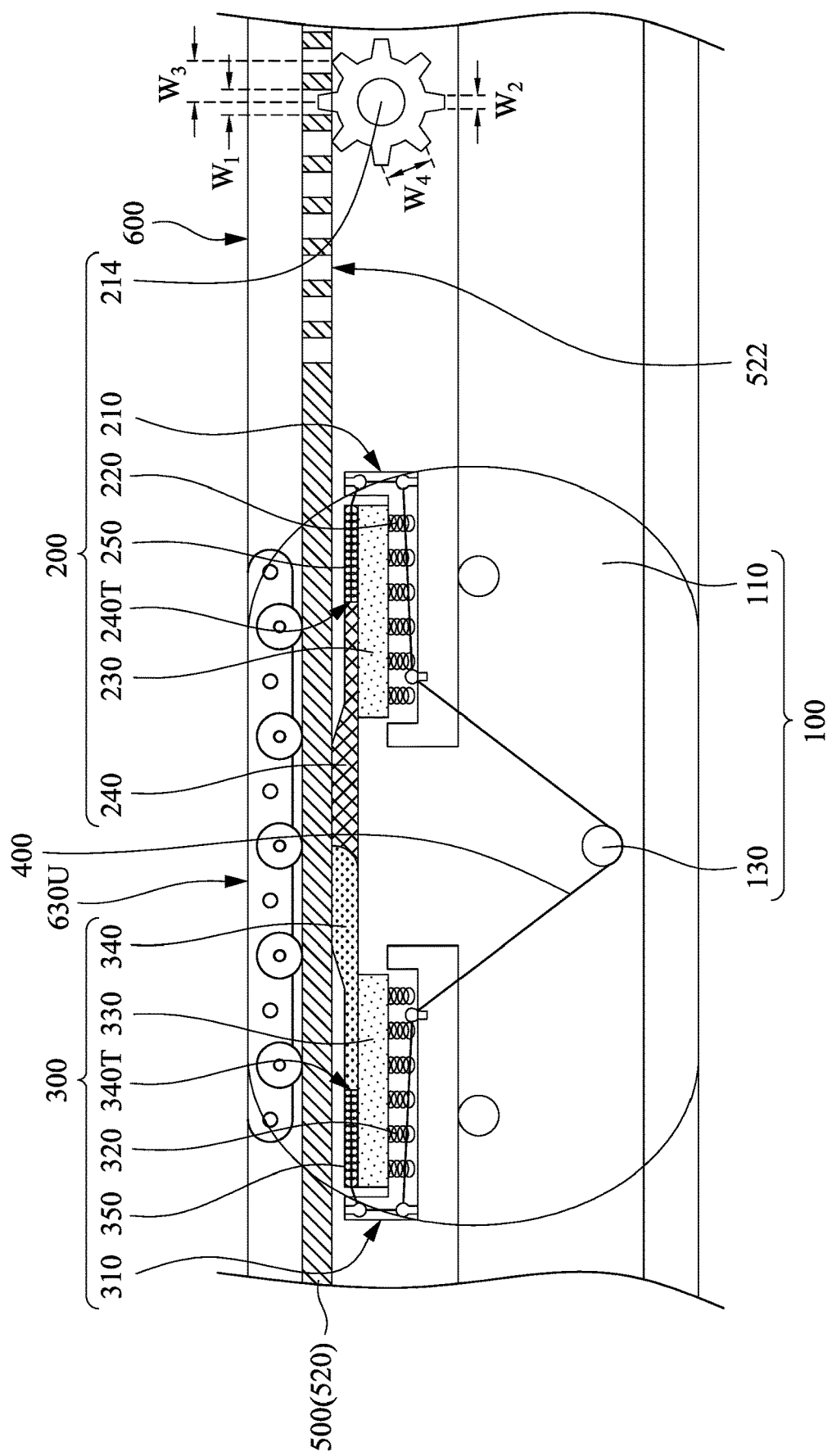
FIG. 3B is a partial enlarged view of FIG. 3A.

FIG. 3A is a cross-sectional view taken along line 3A-3A of FIG. 1. FIG. 3B is a partial enlarged view of FIG. 3A. Referring to FIG. 3A and FIG. 3B, the first support structure 200 and the second support structure 300 are pivoted to the central connector 100, and the first support structure 200 and the second support structure 300 are respectively located at two opposite sides of the central connector 100. The first support structure 200 includes a first recess 210, a first plate 230, a first support element 240, and a plurality of first flexible elements 220 and 250. Specifically, the first recess 210 is located in the central connector 100. The first plate 230 is disposed in the first recess 210. The first support element 240 is movably located over the first plate 230. One of the plurality of first flexible elements 250 is located between one end 240T of the first support element 240 and a sidewall of the first recess 210, and the remaining first flexible elements 220 are located between the first plate 230 and a bottom surface of the first recess 210. Similarly, the second support structure 300 includes a second recess 310, a second plate 330, a second support element 340, and a plurality of second flexible elements 320 and 350. Specifically, the second recess 310 is located in the central connector 100. The second plate 330 is disposed in the second recess 310. The second support element 340 is movably located over the second plate 330. One of the plurality of second flexible elements 350 is located between one end 340T of the second support element 340 and a sidewall of the second recess 310, and the remaining second flexible elements 320 are located between the second plate 330 and a bottom surface of the second recess 310.

In addition, two ends of the first flexible element 220 are respectively connected to the first plate 230 and a bottom wall of the first recess 210, and the axial direction of the first flexible element 220 is parallel to the normal vector of the first plate 230. Two ends of the second flexible element 320 are respectively connected to the second plate 330 and a bottom wall of the second recess 310, and the axial direction of the second flexible element 320 is parallel to the normal vector of the second plate 330. With such design, when the first plate 230 and the second plate 330 are subjected to a downward force, the first flexible element 220 and the second flexible element 320 may be compressed, so that the first recess 210 and the second recess 310 have sufficient spaces for accommodating the first support element 240 and the second support element 340, respectively; when the force is removed, the first plate 230 is returned to the original position in the first recess 210 by the elastic restoring force of the first flexible element 220, and the second plate 330 is returned to the original position in the second recess 310 by the elastic restoring force of the second flexible element 320.

Figure 5:
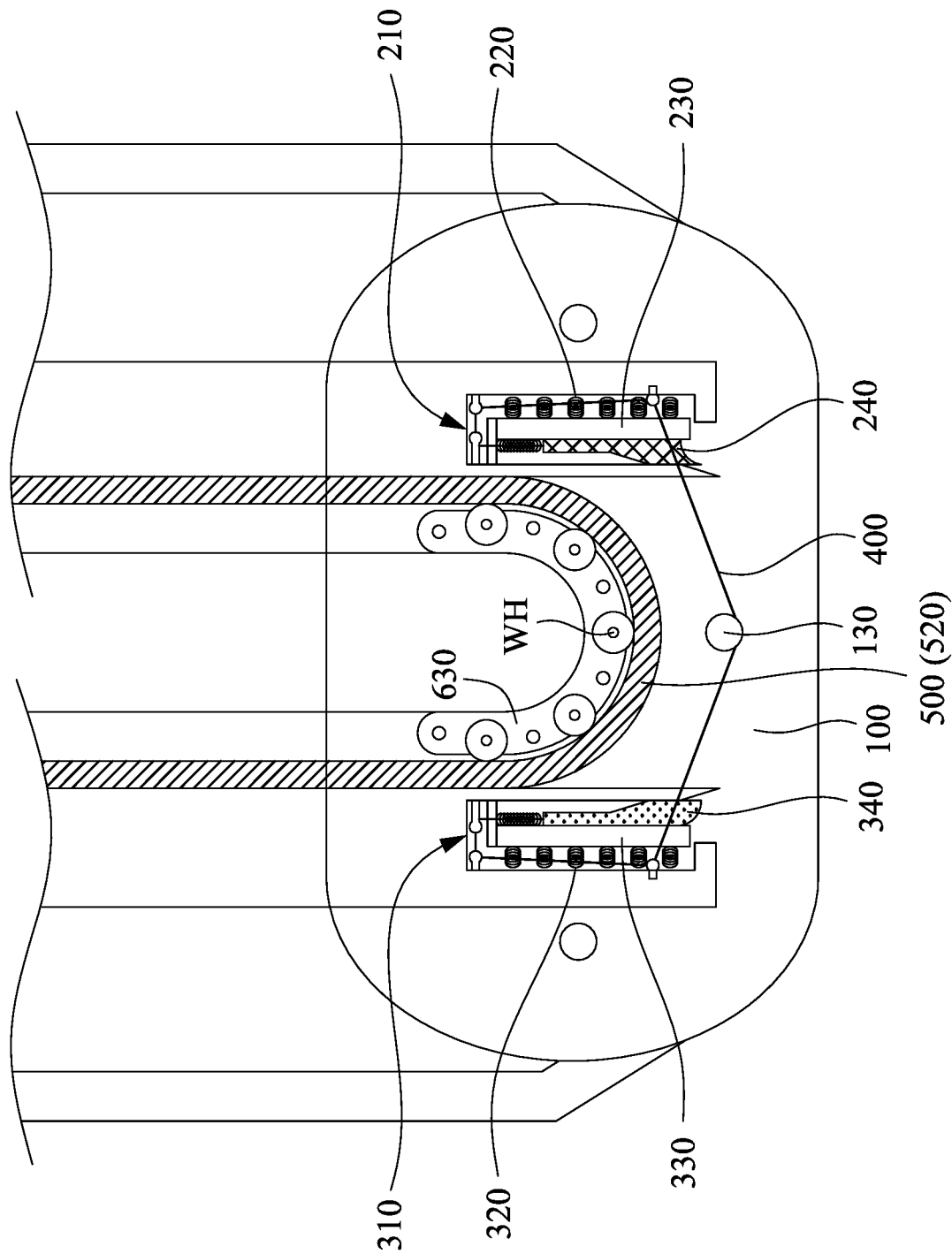
FIG. 5 is a partial cross-sectional view showing the foldable display device of FIG. 3B after being folded.

In addition, two ends of the first flexible element 250 are respectively connected to the end 240T of the first support element 240 and the sidewall of the first recess 210. Two ends of the second flexible element 350 are respectively connected to the end 340T of the second support element 340 and the sidewall of the second recess 310. The foldable display device 10 includes a cable 400. Two ends of the cable 400 are respectively connected to the end 240T of the first support element 240 and the end 340T of the second support element 340, and the cable 400 abuts beneath the abutment post 130 of the central connector 100. That is, the cable 400 surrounds a lower edge of the abutment post 130 to connect the first support element 240 and the second support element 340. When the foldable display device 10 is in a folded state (as shown in FIG. 5), the first support element 240 and the second support element 340 are subjected to the pulling force of the cable 400 to enter the first recess 210 and the second recess 310, respectively. At this time, the first flexible element 250 and the second flexible element 350 are compressed. When the foldable display device 10 is switched from the folded state to the unfolded state (as shown in FIG. 3B), the elastic restoring force of the first flexible element 250 can push a portion of the first support element 240 out of the first recess 210, and the elastic restoring force of the second flexible element 350 can push a portion of the second support element 340 out of the second recess 310, and thus to support the display panel 500. In various examples, the first flexible elements 220, 250 and the second flexible elements 320, 350 may be springs, but are not intended to limit the present invention, and other retractable elastic materials, such as rubber, silicone or soft plastics, may also be used to form the first flexible elements 220, 250 and the second flexible element 320, 350.

In the present embodiment, the first support element 240 has at least a portion 240P between the first plate 230 and a top surface of the first recess 210. The second support element 340 has at least a portion 340P between the second plate 330 and a top surface of the second recess 310. In various examples, the first support element 240 and the second support element 340 have an irregular shape. For example, as shown in FIG. 3A, the portion 240P of the first support element 240 located between the first plate 230 and the top surface of the first recess 210 may be referred to as a tail portion, and a portion away from the tail portion may be referred to as a head portion. The head portion of the first support element 240 has a thickness greater than a thickness of the tail portion thereof, and a portion for connecting the head portion and the tail portion has an inclined surface. When the first support element 240 enters the first recess 210 by the pulling force of the cable 400, the design of the inclined surface of the first support element 240 makes the first support element 240 easier to enter the first recess 210. Similarly, the portion 340P of the second support element 340 between the second plate 330 and the top surface of the second recess 310 may be referred to as a tail portion, and a portion away from the tail portion may be referred to as a head portion. The head portion of the second support element 340 has a thickness greater than a thickness of the tail portion thereof, and a portion for connecting the head portion and the tail portion has an inclined surface. When the second support element 340 enters the second recess 310 by the pulling force of the cable 400, the design of the inclined surface of the second support element 340 makes the second support element 340 easier to enter the second recess 310.

Further, when the foldable display device 10 is in the unfolded state (as shown in FIG. 3A), the first support element 240 is engaged with the second support element 340. In one embodiment, one end of the first support element 240 toward the second support element 340 and one end of the second support element 340 toward the first support element 240 respectively have a concave surface and a convex surface coupled to each other. That is, the surface 240' of the first support element 240 engaged with the second support element 340 is the concave surface so that the first support element 240 and the second support element 340 can be successfully separated during folding the foldable display device 10. In another embodiment, the end of the first support element 240 toward the second support element 340 and the end of the second support element 340 toward the first support element 240 may also respectively have a convex surface and a concave surface, which will be described with FIG. 8.

Returning to FIG. 2, in various embodiments, the first support structure 200 further has a pair of first protruding portions P1. The second support structure 300 also has a pair of second protruding portions P2. Due to the viewing angle, only one first protruding portion P1 and only one second protruding portion P2 are shown in FIG. 2. The pair of first protruding portions P1 respectively protrude from two opposite sidewalls of the first support structure 200 and are respectively disposed in the first sliding slot 112 and the third sliding slot 122. Similarly, the pair of second protruding portions P2 respectively protrude from two opposite sidewalls of the second support structure 300 and are respectively disposed in the second sliding slot 114 and the fourth sliding slot 124.

Referring to FIGS. 3A and 3B, a portion of the display panel 500 may be movably disposed over the first support structure 100, and another portion is fixed on the second support structure 200. In several embodiments, the display panel 500 is a liquid crystal display panel, an organic light emitting display panel, or an electrophoretic display panel.

The display panel 500 includes a flexible pixel array substrate. The flexible pixel array substrate includes a pixel array having a plurality of pixels for displaying images and a cover element provided on a flexible substrate for protecting the pixel array. In several embodiments, the display panel 500 includes an electronic ink layer.

Returning to FIG. 2, in some embodiments, the display panel 500 includes a display region 510 and a non-display region 520 surrounding the display region 510. Referring to FIGS. 3A and 3B, after the first support structure 200, the second support structure 300, and the display panel 500 are assembled, an upper surface 200a of the first support structure 200 may be in direct contact with a portion of the display panel 500, and the second support structure 300 may be adhered to another portion of the display panel 500 using an adhesive (not shown). It should be noted that no adhesive is used between the upper surface 200a of the first support structure 200 and the display panel 500, and the contact surfaces between the upper surface 200a and the display panel 500 are subjected to planarization and anti-friction treatment, so that the coefficient of friction therebetween is less than 0.01. When the foldable display device 10 is bent, the display panel 500 can successfully slide on the upper surface 200a of the first support structure 200, thereby solving the problem of the damage to the display panel due to the inner diameter difference between the display panel and the support structure in the art.

In various embodiments, the first support structure 200 further includes at least one protruding component 214, and the non-display region 520 of the display panel 500 includes at least one hole 522. After the first support structure 200 and the display panel 500 are assembled, the protruding component 214 of the first support structure 200 is disposed in the hole 522. It may be understood that the number of the holes 522 of the non-display region 520 of the display panel 500 is substantially equal to the number of the protruding components 214 of the first support structure 200. In an example, the protruding component 214 is a gear. In another example, the protruding component 214 is a metal post, which will be described with FIG. 9. In some embodiments, the number of the holes 522 may match the total number of teeth of all of the gears, but not limited. It should be noted that, as shown in FIG. 2 and FIG. 3B, the hole 522 is designed to be rectangle-shaped or square-shaped, in which a length $W_1$ of the hole 522 is approximately slightly larger than a tooth width $W_2$, and a distance $W_3$ between centers of any two adjacent holes 522 is approximately equal to the teeth pitch $W_4$ between any two adjacent teeth in the gear. By the arrangement of the gears, it is possible to restrict the display panel 500 to slide only along the horizontal direction in the folded state. That is, the display panel 500 only has the degree of freedom of displacement in the horizontal direction.

Referring to FIG. 1 and FIG. 2 simultaneously, according to various embodiments of the present invention, the foldable display device 10 further includes a frame 600 disposed over the display panel 500. More specifically, the frame 600 is disposed over the non-display region 520 of the display panel 500. The frame 600 includes a first frame 610, a second frame 620, a first hinge 630, and a second hinge 640. Specifically, the first hinge 630 has a first terminal end 632 and a second terminal end 634 pivoted to the first frame 610 and the second frame 620, respectively. The second hinge 640 has a third terminal end 642 and a fourth terminal end 644 pivoted to the first frame 610 and the second frame 620 respectively. In the present embodiment, the first frame 610 and the second frame 620 of the frame 600 may be symmetrically disposed with respect to the first hinge 630 and the second hinge 640. In various embodiments, after the frame 600 and the display panel 500 are assembled, the second frame 620 may be directly adhered to the upper surface 520a of the non-display region 520 of the display panel 500 using an adhesive (not shown). The first frame 610 can be in direct contact with the upper surface 520a of the non-display region 520 of the display panel 500, as shown in FIG. 3A. It should be noted that no adhesive is used between the first frame 610 and the upper surface 520a of the non-display region 520 of the display panel 500, and the contact surfaces between the first frame 610 and the display panel 500 is subjected to planarization and anti-friction treatment, so that the coefficient of friction therebetween is less than 0.01. As shown in FIG. 3A, in the present embodiment, the first frame 610 has a side portion 610S, and after the frame 600 and the display panel 500 are assembled, the side portion 610S of the first frame 610 is spaced apart from the display panel 500 with a distance SP. In such design, since the first frame 610 and the first support structure 200 are not adhered to the display panel 500, when the foldable display device 10 is in the folded state, the display panel 500 is free to slide along the horizontal direction. Moreover, the distance SP can compensate for the inner diameter difference between the display panel 500 and the first support structure 200, thereby avoiding the damage to the display panel. In various embodiments, the first hinge 630 and the second hinge 640 respectively include a plurality of hinge units 630U and hinge units 640U, which will be described in detail below.

Figure 4A:
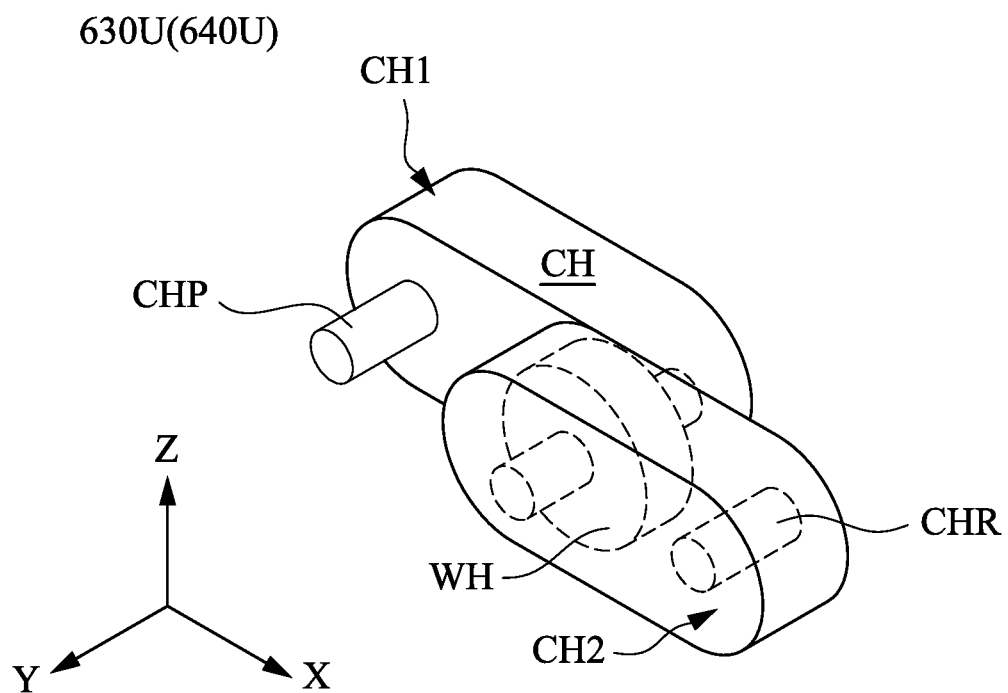
FIG. 4A is a perspective view showing the hinge unit of FIG. 2.
Figure 4B:
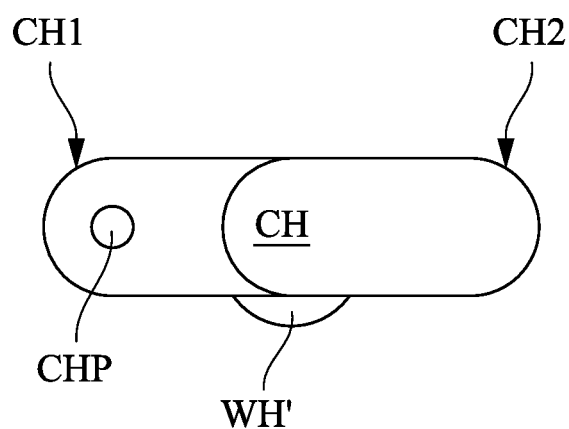
FIG. 4B is a front view of the hinge unit of FIG. 4A.

FIG. 4A is a perspective view showing the hinge unit 630U or 640U of FIG. 2. FIG. 4B is a front view of the hinge unit 630U or 640U of FIG. 4A. Referring to FIGS. 4A and 4B simultaneously, each of the hinge unit 630U and the hinge unit 640U includes a hinge body CH and a roller WH. Specifically, the hinge body CH has a first end CH1, a second end CH2, and an intermediate portion connecting the first end CH1 and the second end CH2, in which the roller WH is disposed in the intermediate portion of the hinge body CH. The first end CH1 of the hinge body CH has a protruding portion CHP protruding from the hinge body CH along the Y direction, and the second end CH2 of the hinge body CH has a recess portion CHR recessed in the hinge body CH along the Y direction. In such design, when the plurality of hinge units 630U are pivoted to each other, the protruding portion CHP of the first end CH1 of one hinge unit 630U is paired and engaged with the recess portion CHR of the second end CH2 of another hinge unit 630U. The intermediate portion of the hinge body CH has a relatively large thickness with respect to the first end CH1 and the second end CH2 for embedding the roller WH. In the present embodiment, a portion WH' of the roller WH shown in the front view protrudes from the hinge body CH. The structure of the hinge unit 640U is the same as that of the hinge unit 630U, and is not described again.

Referring to FIG. 3B simultaneously, after the frame 600 and the display panel 500 are assembled, the portion WH' of the roller WH protruding from the hinge body CH of the hinge unit 630U is in contact with the display panel 500. When the foldable display device 10 is in the unfolded state or the folded state, the portion WH' of the roller WH protruding from the hinge body CH can abut against the display panel 500 to prevent the display panel 500 from warping. The portion WH' of the roller WH protruding from the hinge body CH of the hinge unit 640U is also in contact with the display panel 500, and is not described again.

Returning to FIG. 2, the foldable display device 10 may further include a base 900 in accordance with various embodiments of the present invention. The base 900 includes a first bottom plate 910 and a second bottom plate 920, in which two opposite ends of an edge of the first bottom plates 910 have a pair of first slots 912, and two opposite ends of an edge of the second bottom plates 920 have a pair of second slots 922. The first support structure 200 also has a pair of third protruding portions P3. The second support structure 300 also has a pair of fourth protruding portions P4. Due to the viewing angle, only one third protruding portion P3 and only one fourth protruding portion P4 are shown in FIG. 2. The third protruding portion P3 is symmetrically disposed with the first protruding portion P1. The fourth protruding portion P4 is symmetrically disposed with the second protruding portion P2. After the central connector 100, the first support structure 200, the second support structure 300, and the base 900 are assembled, the third protruding portion P3 of the first support structure 200 is substantially aligned with and disposed in the first slot 912 of the first bottom plate 910; the fourth protruding portion P4 of the second support structure 300 is substantially aligned with and disposed in the second slot 922 of the second bottom plate 920; and the first bottom plate 910 and the second bottom plate 920 are side by side and fixed to each other. It may be understood that shapes of the first slot 912 and the second slot 922 matches shapes of the third protruding portion P3 and the fourth protruding portion P4. In the present embodiment, after the base 900 and the frame 600 are assembled, referring to FIG. 3A, the portion where the base 900 and the frame 600 are in contact may be fixed by a connector D. In many examples, the connector D may be, for example, a screw, but is not limited thereto.

It should be understood that connection relationships and materials of the elements that have been described will not be repeated. In the following description, different states when the foldable display device 10 is used will be described.

FIG. 5 is a partial cross-sectional view showing the foldable display device 10 of FIG. 3B after being folded. As shown in FIG. 5, when the foldable display device 10 is switched from the unfolded state to the folded state, the rollers WH of the first hinge 630 and the second hinge 640 abut against the non-display region 520 of the display panel 500, such that the desired radius of curvature of the display panel 500 can be maintained. At the same time, the first support element 240 is pulled into the first recess 210 by the cable 400, and the second support element 340 is pulled into the second recess 310 by the cable 400. More specifically, as described above, since the thickness of the head portion of the first support element 240 is greater than the thickness of the tail portion thereof, when the head portion of the first support element 240 enters the first recess 210, the first plate 230 is subjected to the downward pressure and thus to compress the first flexible element 220. Similarly, since the thickness of the head portion of the second support element 340 is greater than the thickness of the tail portion thereof, when the head portion of the second support element 340 enters the second recess 310, the second plate 330 is subjected to the downward pressure and thus to compress the second flexible element 320. When the foldable display device 10 is in the folded state, there is a sufficient space beneath the central portion (i.e., the bent region) of the display panel 500 for extending downward to avoid the display panel 500 from being subjected to additional stress.

Figure 6:
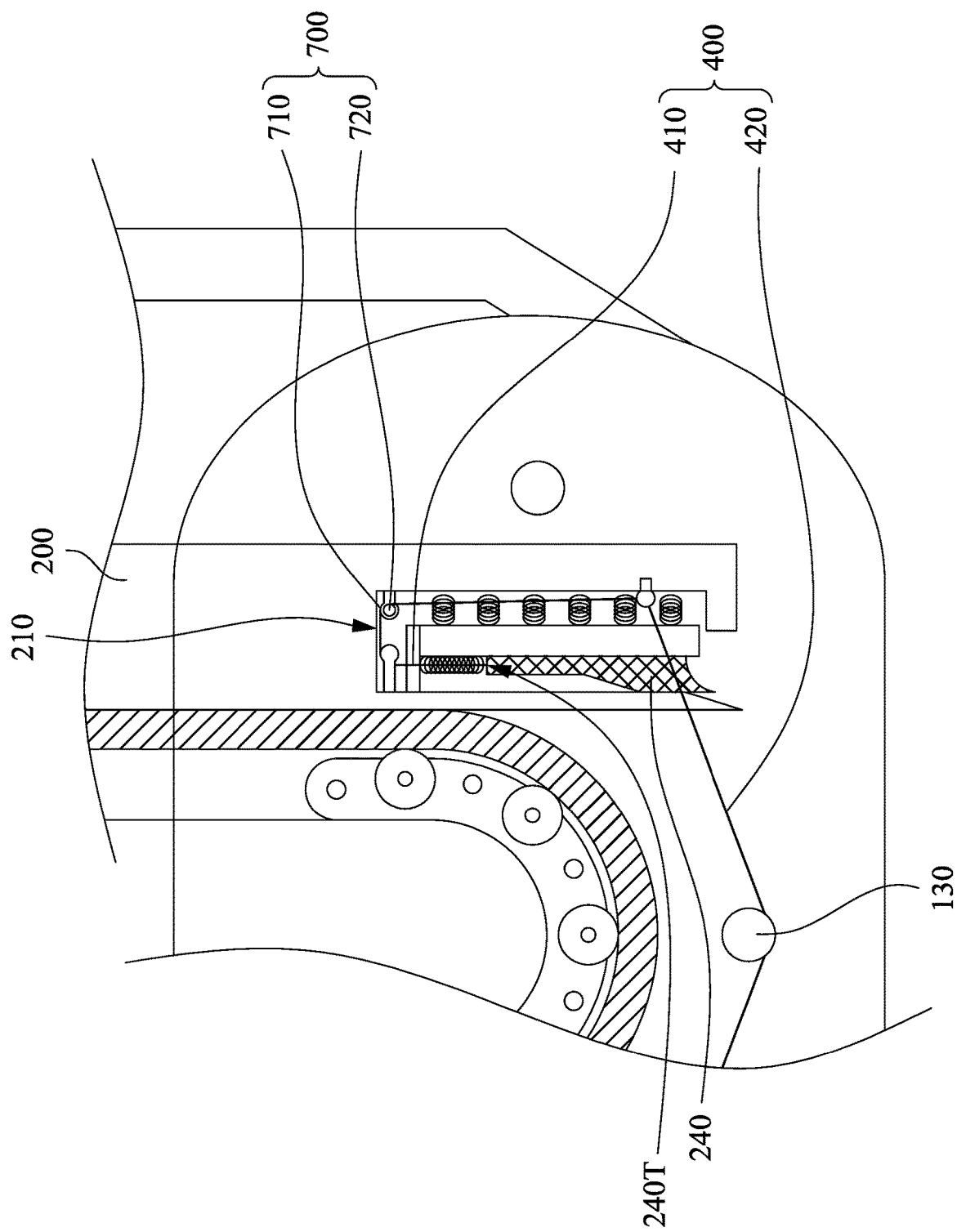
FIG. 6 is a partial enlarged view of FIG. 5.
Figure 7:
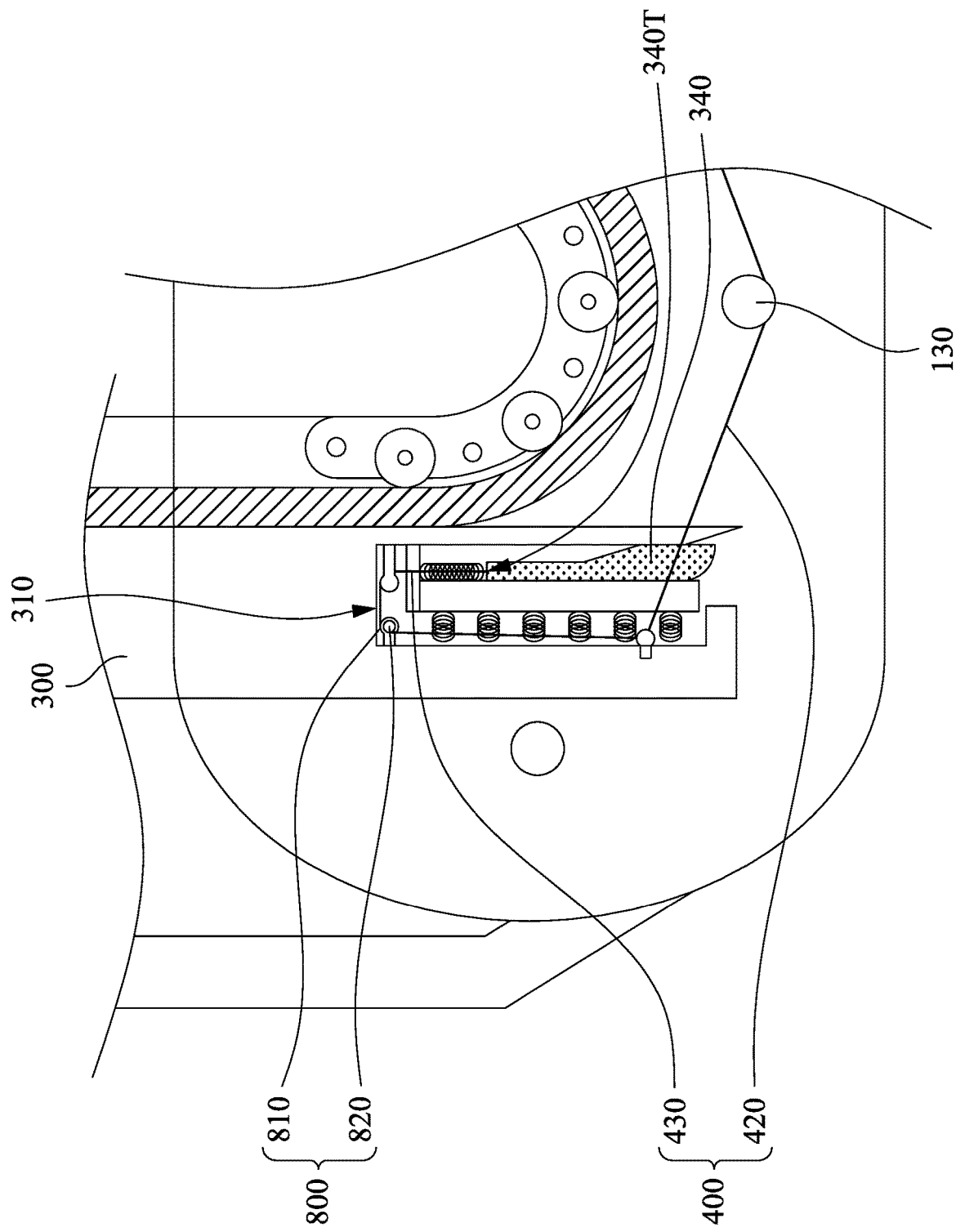
FIG. 7 is a partial enlarged view of FIG. 5.

FIG. 6 and FIG. 7 show partial enlarged views of FIG. 5. Referring to FIG. 6, the foldable display device 10 further includes a first axle assembly 700 disposed in the first recess 210. The first axle assembly 700 includes a first wheel 710 and a second wheel 720. The first wheel 710 is coaxial with the second wheel 720, and the radius of the first wheel 710 is greater than the radius of the second wheel 720. More specifically, the cable 400 includes a first portion 410 and a second portion 420 adjacent to each other, in which the first portion 410 connects the terminal end 240T of the first support element 240 and winds on the first wheel 710, and the second portion 420 of the cable 400 winds on the second wheel 720. Next, referring to FIG. 7, the foldable display device 10 further includes a second axle assembly 800 disposed in the second recess 310. The second axle assembly 800 includes a third wheel 810 and a fourth wheel 820. The third wheel 810 is coaxial with the fourth wheel 820, and the radius of the third wheel 810 is greater than the radius of the fourth wheel 820. More specifically, the cable 400 further includes a third portion 430 adjacent to the second portion 420. The second portion 420 of the cable 400 surrounds and is fixed beneath the abutment post 130 and winds on the fourth wheel 820, and the third portion 430 of the cable 400 winds on the third wheel 810 and connects to the terminal end 340T of the second support element 340.

Figure 8:
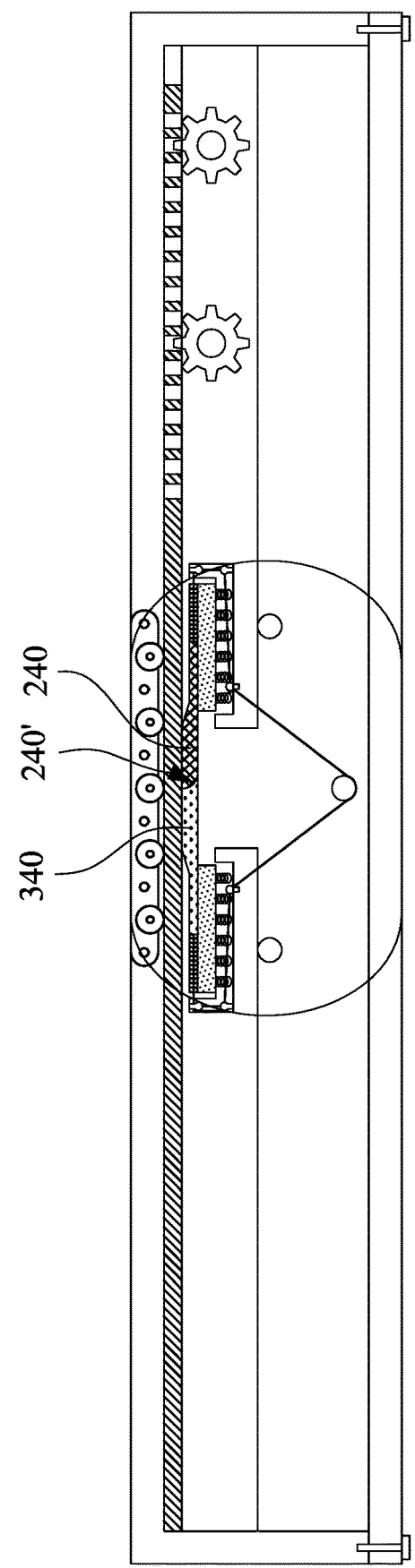
FIG. 8 is a cross-sectional view showing a foldable display device according to another embodiment of the present invention, and the cross-sectional position of which is the same as that of FIG. 3A.

FIG. 8 is a cross-sectional view showing a foldable display device 20 according to another embodiment of the present invention, and the cross-sectional position of which is the same as that of FIG. 3A. The difference between the embodiment of FIG. 8 and that of FIG. 3A is that one end of the first support element 240 of the foldable display device 20 and one end of the second support element 340 thereof respectively have convex and concave surfaces coupled to each other. That is, in the foldable display device 20, the surface 240' of the first support element 240 engaged with the second support element 340 is convex so that the first support element 240 and second support element 340 can be successfully separated when folding the foldable display device 10.

Figure 9:
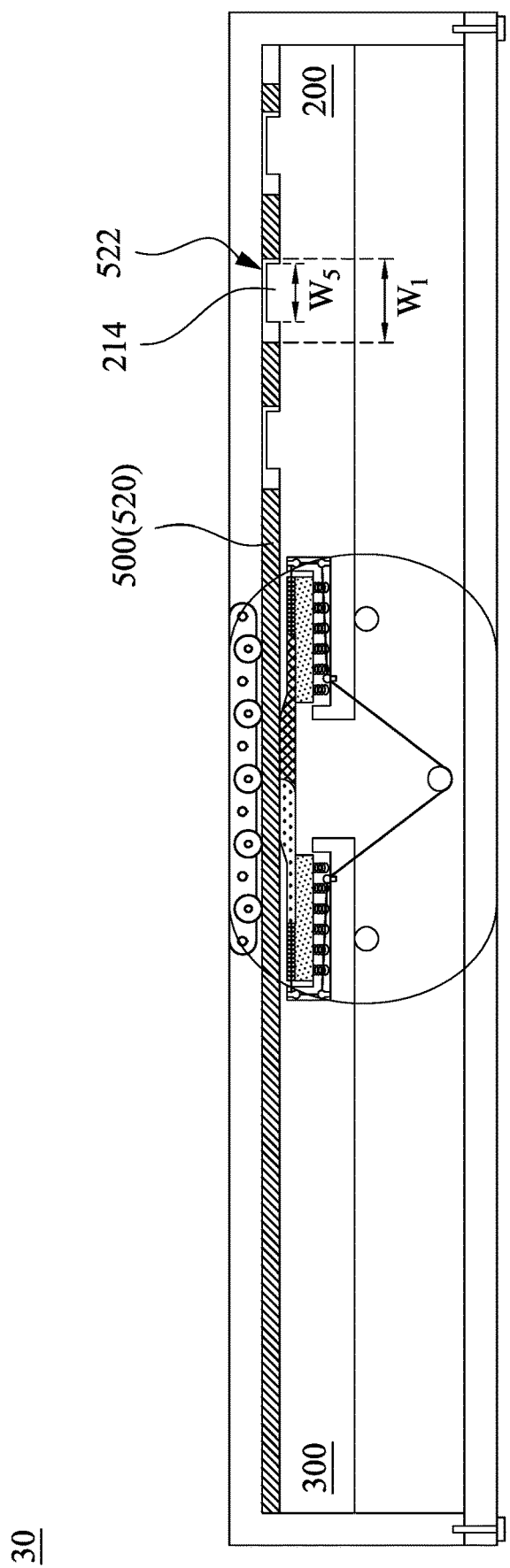
FIG. 9 is a cross-sectional view showing a foldable display device according to another embodiment of the present invention, and the cross-sectional position of which is the same as that of FIG. 3A.

FIG. 9 is a cross-sectional view showing a foldable display device 30 according to another embodiment of the present invention, and the cross-sectional position of which is the same as that of FIG. 3A. The difference between the embodiment of FIG. 9 and that of FIG. 3A is that the protruding component 214 of the first support structure 200 of the foldable display device 30 is a metal post. After the first support structure 200 and the display panel 500 are assembled, the protruding component 214 of the first support structure 200 is disposed in the hole 522. It is appreciated that the number of the holes 522 should match the number of the metal posts. As described above, the hole 522 of the non-display region 520 of the display panel 500 is designed to be rectangle-shaped, but the invention is not limited thereto, or to be ellipse-shaped. Such design can restrict the display panel 500 to slide only along the horizontal direction in the folded state. The length $W_1$ of the hole 522 shown in the cross-sectional view taken along line 3A-3A needs to be approximately slightly larger than the length $W_5$ of the metal post. With such design, when the foldable display device 30 is folded, the display panel 500 can slide along the horizontal direction to compensate for the inner diameter difference between the display panel 500 and the first support structure 200, thereby avoiding the damage to the display panel.

Figure 10:
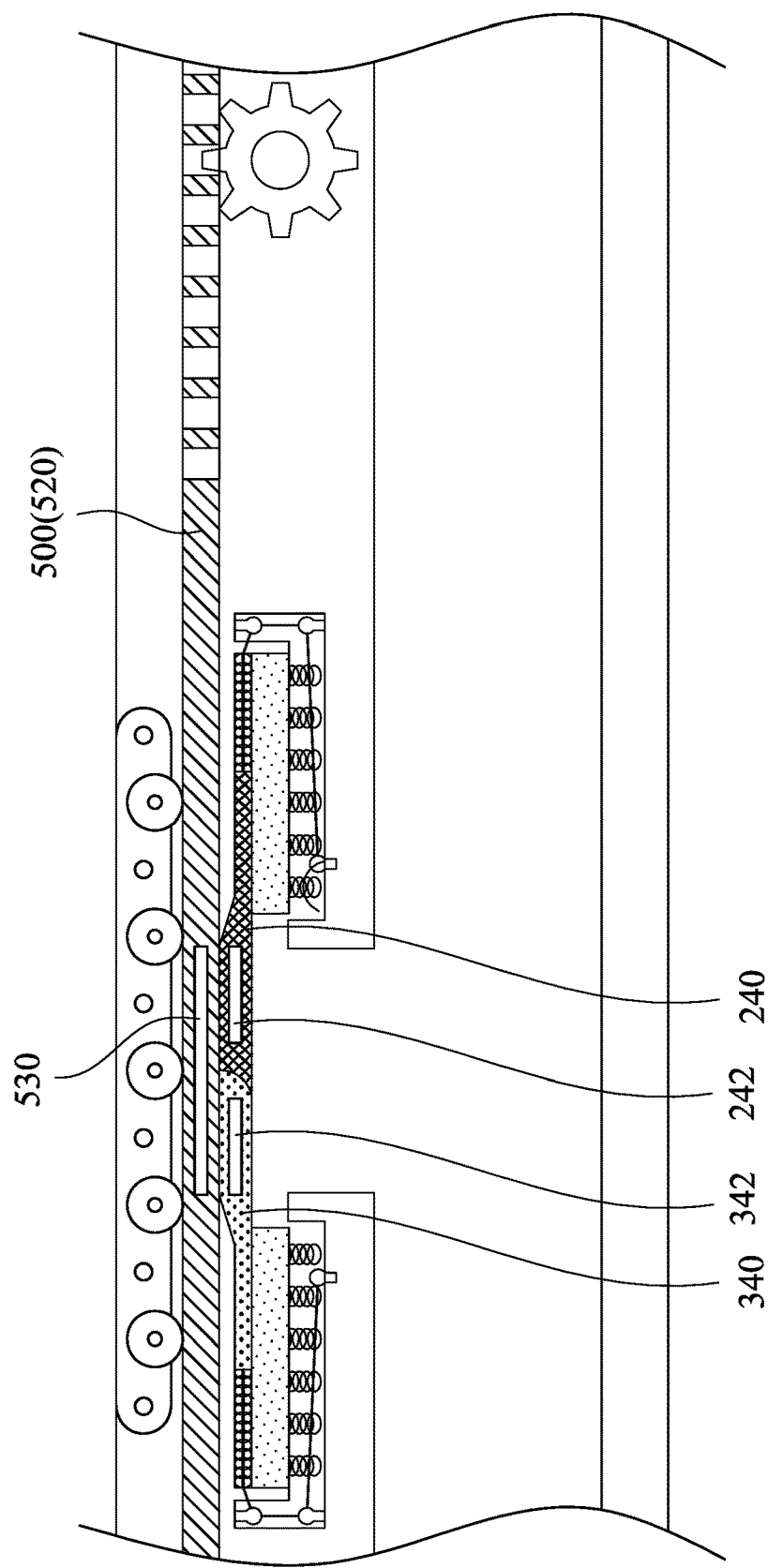
FIG. 10 is a cross-sectional view showing a foldable display device according to another embodiment of the present invention, and the cross-sectional position of which is the same as that of FIG. 3A.

FIG. 10 is a cross-sectional view showing a foldable display device 40 according to another embodiment of the present invention, and the cross-sectional position of which is the same as that of FIG. 3A. The difference between the embodiment of FIG. 10 and that of FIG. 3A is that the display panel 500 of the foldable display device 40 may further include a first electrode 530, and the first support element 240 and the second support element 340 respectively include a second electrode 242 and a second electrode 342. In other embodiments, only one of the first support element 240 and the second support element 340 has a second electrode. In the present embodiment, the first electrode 530 is overlapped with the second electrodes 242, 342. The first electrode 530 and the second electrodes 242, 342 may be electrically connected to a power source (not shown) to generate an electric or magnetic field. More specifically, when the foldable display device 40 is in the unfolded state, opposite charges (e.g., the first electrode 530 generates a positive charge, and the second electrodes 242, 342 generate a negative charge) may be generated between the first electrode 530 and the second electrode 242 and between the first electrode 530 and the second electrode 342, such that the display panel 500 may be more flat on the first support element 240 and the second support element 340. When bending the foldable display device 40, the first electrode 530 and the second electrodes 242, 342 may generate the same charge (e.g., the first electrode 530 and the second electrode 242, 342 simultaneously generate a positive or negative charge), such that the display panel 500 may be easily detached from the first support element 240 and the second support element 340, and thus the foldable display device 40 may be more easily bent.

Figure 11:
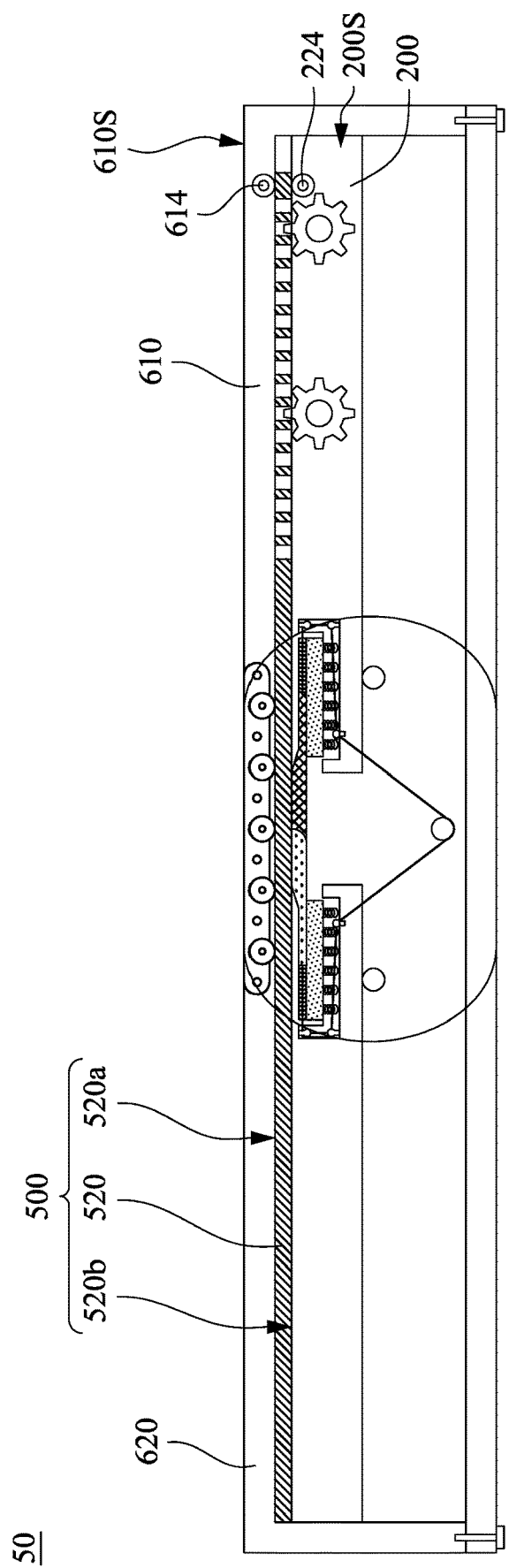
FIG. 11 is a cross-sectional view showing a foldable display device according to another embodiment of the present invention, and the cross-sectional position of which is the same as that of FIG. 3A.

FIG. 11 is a cross-sectional view showing a foldable display device 50 according to another embodiment of the present invention, and the cross-sectional position of which is the same as that of FIG. 3A. The difference between the embodiment of FIG. 11 and that of FIG. 3A is that the side portion 610S of the first frame 610 of the frame 600 of the foldable display device 50 may further include at least one first round wheel 614, such as a plurality of pairs of the first round wheels 614. The first round wheel 614 is in contact with the upper surface 520a of the non-display region 520 of the display panel 500. Such design can reduce the friction between the non-display region 520 of the display panel 500 and the first frame 610, so that when the foldable display device 50 is bent or unfolded, the display panel 500 therein can successfully slide along the horizontal direction. In addition, in the present embodiment, the first support structure 200 further has a side portion 200S corresponding to the side portion 610S of the first frame 610, and the side portion 200S may further include at least one second round wheel 224, such as a plurality of pairs of the second round wheels 224. The second round wheel 224 is in contact with the lower surface 520b of the non-display region 520 of the display panel 500. Such design can reduce the friction between the non-display region 520 of the display panel 500 and the first support structure 200, so that when the foldable display device 50 is bent or unfolded, the display panel 500 therein can successfully slide along the horizontal direction.

Given the above, the foldable display device of the present invention has the first support element and the second support element that may be pushed when unfolded and retracted when folded. With such design, the central region of the display panel may be supported by the first support element and the second support element when unfolded, and there is a sufficient space beneath the central portion of the display panel for extending downward to avoid the display panel from being subjected to additional stress when bent. In addition, the foldable display device only secures a portion of the display panel such that another portion of the display panel may be moved over the first support structure when bent to avoid damaging the display panel.

Although the disclosure has been disclosed in the above embodiments, it is not intended to limit the disclosure. It is apparent to those skilled in the art that various alternations and modifications may be made without departing from the spirit and scope of the present disclosure, and the scope of the present disclosure is defined by the scope of the appended claims.

What is claimed is:

1. A foldable display device, comprising:
a central connector having an abutment post;
a first support structure pivoted to the central connector, and comprising:
    a first recess located in the central connector;
    a first plate disposed in the first recess;
    a first support element movably located over the first plate; and
    a plurality of first flexible elements, one of the first flexible elements located between a first end of the first support element and a sidewall of the first recess, and the remaining first flexible elements located between the first plate and a bottom surface of the first recess;
a second support structure pivoted to the central connector, and the second and first support structures respectively located at two opposite sides of the central connector, and the second support structure comprising:
    a second recess located in the central connector;
    a second plate disposed in the second recess;
    a second support element movably located over the second plate; and
    a plurality of second flexible elements, one of the second flexible elements located between a first end of the second support element and a sidewall of the second recess, and the remaining second flexible elements located between the second plate and a bottom surface of the second recess;
a cable having two ends respectively connected to the first end of the first support element and the first end of the second support element, and the cable abutting beneath the abutment post; and
a display panel, a portion of the display panel movably disposed over the first support structure, and another portion of the display panel fixed on the second support structure.

2. The foldable display device of claim 1, wherein the first support structure further comprises at least one protruding component, and the display panel comprises a display region and a non-display region, and the non-display region comprises at least one hole, and the protruding component is disposed in the hole.

3. The foldable display device of claim 2, wherein the protruding component is a gear or a metal post.

4. The foldable display device of claim 1, wherein a second end of the first support element and a second end of the second support element respectively have a convex surface and a concave surface coupled to each other.

5. The foldable display device of claim 1, further comprising a frame disposed over the display panel, wherein the frame comprises a first frame, a second frame, a first hinge, and a second hinge, and the first hinge has a first terminal end and a second terminal end pivoted to the first frame and the second frame, respectively, and the second hinge has a third terminal end and a fourth terminal end pivoted to the first frame and the second frame, respectively.

6. The foldable display device of claim 5, wherein each of the first hinge and the second hinge comprises a plurality of hinge units, and each of the hinge units comprises a hinge body and a roller, and the roller is disposed in the hinge body and in contact with the display panel.

7. The foldable display device of claim 5, wherein the first frame is in contact with an upper surface of a non-display region of the display panel.

8. The foldable display device of claim 5, wherein the first frame has a side portion, and the side portion comprises a first round wheel in contact with an upper surface of a non-display region of the display panel.

9. The foldable display device of claim 1, wherein the first support structure has a side portion, and the side portion comprises a second round wheel in contact with a lower surface of a non-display region of the display panel.

10. The foldable display device of claim 1, wherein the display panel further comprises a first electrode, and at least one of the first support element and the second support element comprises a second electrode, and the first electrode is overlapped with the second electrode.

11. The foldable display device of claim 1, wherein the display panel is in contact with an upper surface of the first support structure.

12. The foldable display device of claim 1, further comprising a first axle assembly disposed in the first recess, the first axle assembly comprising a first wheel and a second wheel, the first wheel coaxial with the second wheel, and a radius of the first wheel greater than a radius of the second wheel, wherein the cable comprises a first portion and a second portion adjacent to each other, and the first portion of the cable connects a terminal end of the first support element and winds the first wheel, and the second portion of the cable winds the second wheel.

13. The foldable display device of claim 12, further comprising a second axle assembly disposed in the second recess, the second axle assembly comprising a third wheel and a fourth wheel, the third wheel coaxial with the fourth wheel, and a radius of the third wheel greater than a radius of the fourth wheel, wherein the cable further comprises a third portion adjacent to the second portion, and the second portion surrounds and is fixed beneath the abutment post and winds the fourth wheel, and the third portion winds the third wheel and connects a terminal end of the second support element.

14. The foldable display device of claim 1, wherein the central connector further comprises a first sheet and a second sheet, and the abutment post connects the first sheet and the second sheet, and the first sheet has a first sliding slot and a second sliding slot, and the second sheet has a third sliding slot and a fourth sliding slot.

15. The foldable display device of claim 14, wherein the first support structure has a pair of first protruding portions respectively disposed in the first sliding slot and the third sliding slot.

16. The foldable display device of claim 14, wherein the second support structure has a pair of second protruding portions respectively disposed in the second sliding slot and the fourth sliding slot.

* * * * *